Aug. 30, 1927.  
P. H. RYLANDER  
1,641,097  
MEANS FOR STERILIZING COTTON AND OTHER SEEDS  
Filed April 15, 1925   2 Sheets-Sheet 1
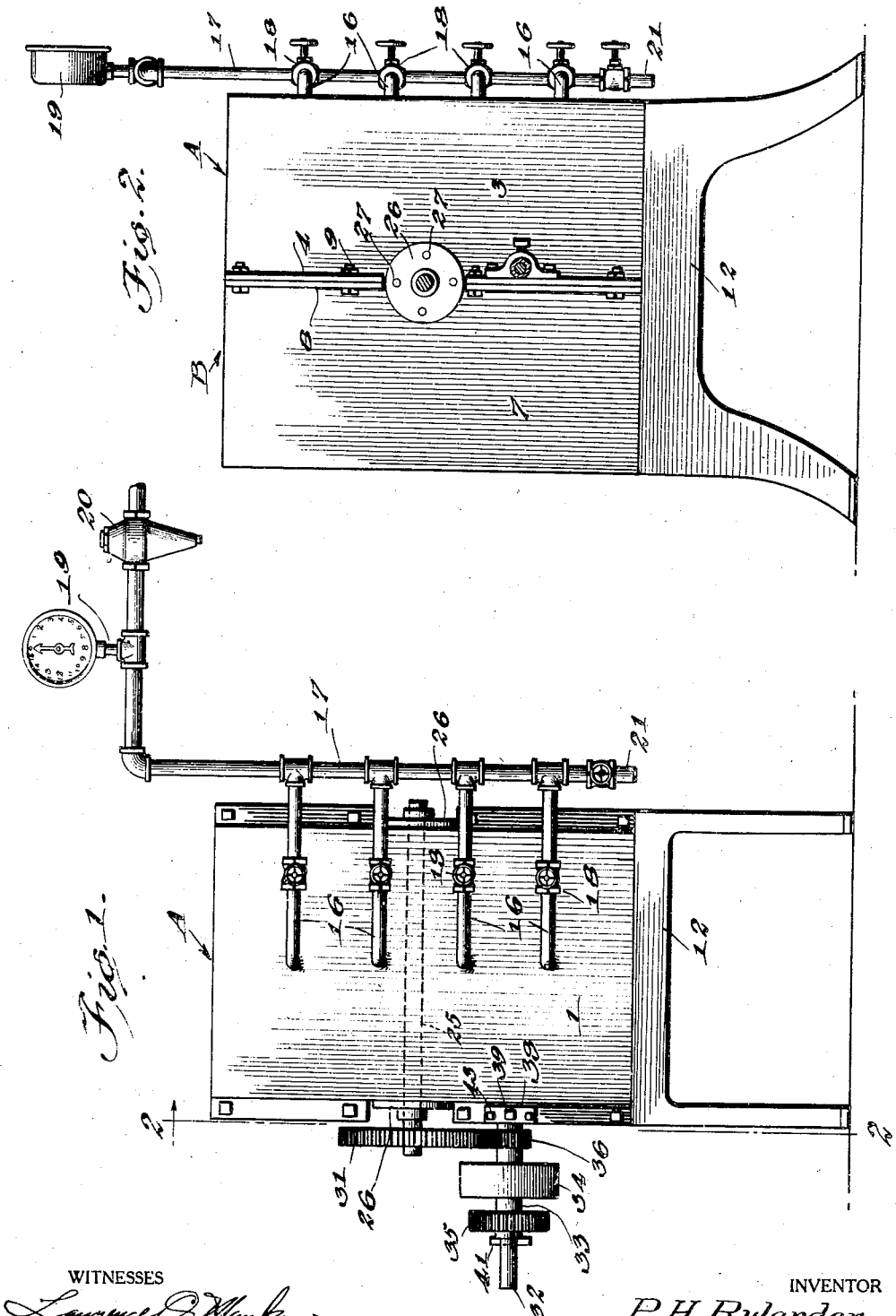
WITNESSES
INVENTOR  
P. H. Rylander,  
BY  
ATTORNEYS Aug. 30, 1927.
P. H. RYLANDER
1,641,097
MEANS FOR STERILIZING COTTON AND OTHER SEEDS
Filed April 15, 1925    2 Sheets-Sheet 2
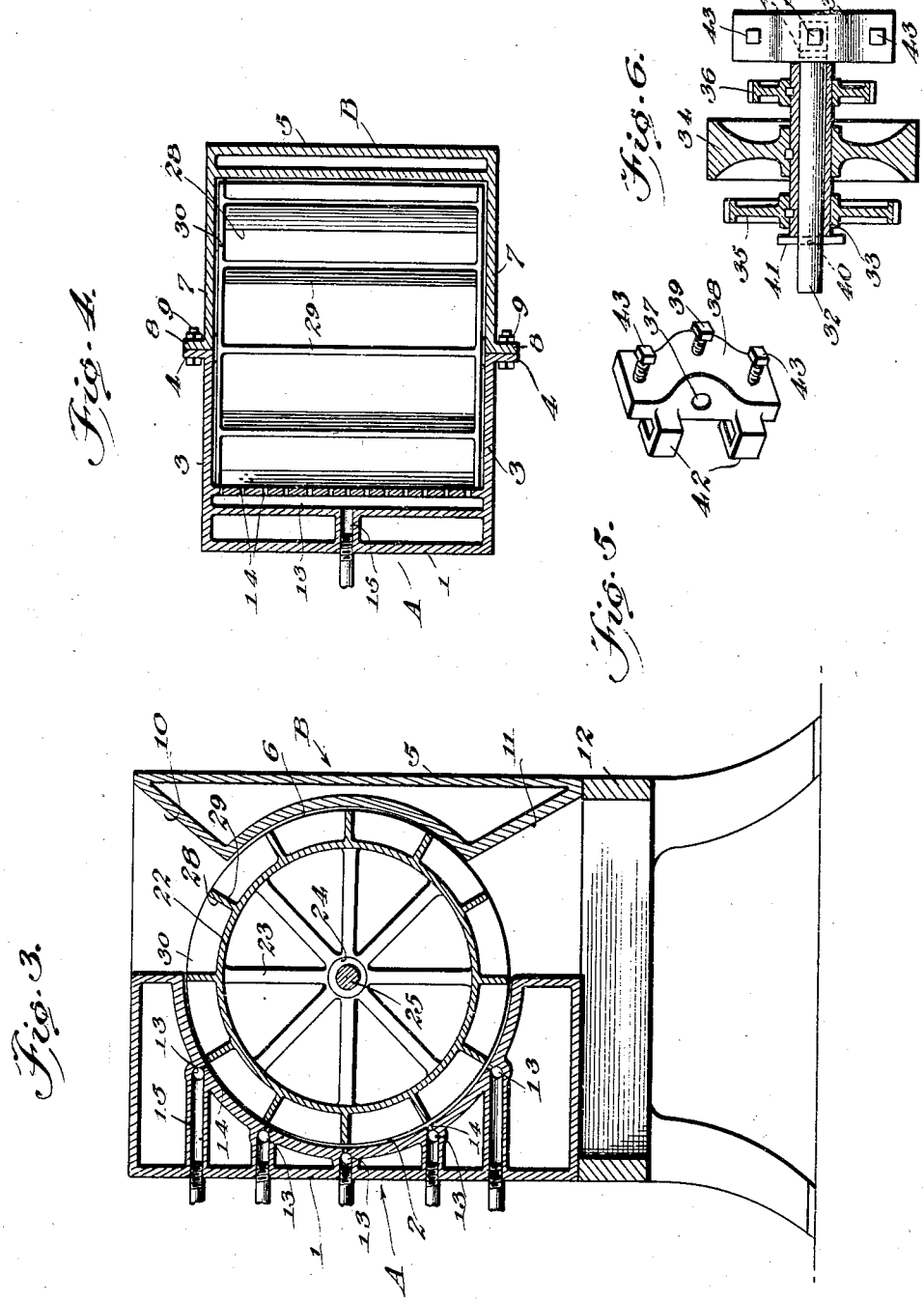
INVENTOR
P. H. Rylander,
BY
ATTORNEYS Patented Aug. 30, 1927.

1,641,097

UNITED STATES PATENT OFFICE.

PARRISH HENDRICKS RYLANDER, OF AUSTIN, TEXAS, ASSIGNOR TO WILLIAM P. RYLANDER, JAMES B. RYLANDER, AND PARRISH H. RYLANDER, CONSTITUTING THE FIRM OF THE RYLANDER COMPANY, OF AUSTIN, TEXAS.

MEANS FOR STERILIZING COTTON AND OTHER SEEDS.

Application filed April 15, 1925. Serial No. 23,437.

My invention is an improvement in means for sterilizing cotton and other seeds, and it consists in the combinations, constructions and arrangements herein described and claimed.

An object of the invention is the provision of an improved sterilizing apparatus which affords facilities for subjecting all seeds of a mass of considerable extent to the action of live steam uniformly and without appreciable loss of steam during the operation of treating the seeds, whereby the extermination of insects, their larvæ, and germs which infest the seeds will be effected without injury to the seeds and the treated seeds will be rendered practically immune to such injury as otherwise would be caused by generated heat when the seeds are stored in bulk.

A further object of the invention is the provision of a sterilizing apparatus of the character described which can be adjusted to effect the uniform and thorough treatment of various quantities of seeds within a given time.

Other objects and advantages of the invention will be apparent from the following description, considered in conjunction with the accompanying drawings, in which Figure 1 is a side elevation of the improved sterilizing apparatus, Figure 2 is a section substantially along the line 2—2 of Figure 1, looking in the direction of the arrows.

Figure 3 is a transverse vertical section through the sterilizing apparatus,

Figure 4 is a horizontal section through the housing of the sterilizing apparatus, a rotary seed carrier therein being shown in plan, Figure 5 is a perspective view of a bearing block and a means for adjustably and detachably securing the bearing block to the housing of the sterilizer, Figure 6 is a view showing in elevation the bearing block exhibited in Figure 5 together with a shaft which is removably supported by said block and a pulley and two separate gears which are mounted rotatably on the shaft, the pulley and the gears being shown in vertical section.

The improved sterilizer includes a case or housing which comprises two cooperative sections generally indicated at A and B respectively. The section A may be formed by casting or in any other suitable known manner to provide a body 1 which may be hollow as shown and which is formed to provide a cavity 2 in the inner side thereof, the side wall of the cavity 2 being semi-circular in vertical section and extending vertically for somewhat less than the full height of the body 1. The cavity 2 also has a length somewhat less than that of the section 2 and is closed at its ends by plate-like extensions 3 at the opposite ends of the body 1, the inner edges of the end extensions 3 being merged into outwardly extending lateral flanges 4 which lie in the same vertical plane.

The section B likewise is formed by casting or in any other suitable known manner to provide a body 5 having a cavity 6 in its inner side. The cavity 6 is of less height than the cavity 2 but the side wall thereof is curved concavely along the arc of a circle struck by a radius of the same half-circle with which the concavely curved side wall of the cavity 2 coincides. The body 5 of the section B is formed with plate-like end extensions 7 which define the ends of the cavity 6 and extend beyond the latter as best seen in Figure 4, being merged at their inner side edges into outwardly extending flanges 8 which lie in the same vertical plane and which are adapted to be secured flatwise against the corresponding flanges 4 by means of bolts and nuts indicated at 9 or like fastening devices so that the sections A and B of the sterilizer case will be secured together in position to complement each other and the concavely curved side wall of the cavity 6 and the cavity 2 will be spaced from each other and will lie in arcs of the same circle. With this arrangement, the cavity 6, the cavity 2 and the space between the cavities 2 and 6 within the housing form a sterilizing chamber which is in open communication at the upper side of the housing with the space at the outerside of the housing through a passage or opening 10 which is located entirely between the upper end portion of the end extensions 7 of the section B. This sterilizing chamber within the housing between the sections A and B also is in communication with the space below the housing through an opening or passage 11 which is completely disposed between the lower portion of the end extensions 7 and the body 5 of the section B. The openings 10 and 11 preferably enlarge toward their outer ends as shown.

The housing A—B is supported in any suitable known manner, as by means of a stand indicated at 12, so that the opening 11 will be unobstructed at its lower end.

The body 1 of the section A is formed with a plurality of vertically spaced horizontal elongated chambers 13, the walls of which may be integral portions of the body 1. Each chamber 13 extends for substantially the full length of the cavity 2 and communicates with the latter through regularly spaced discharge orifices or ports 14. A duct 15 leads from each chamber 13 through the body 1 to the outer side wall of the body and preferably communicates at its inner end with the chamber 13 with which it is associated intermediate the length of the latter. The respective ducts 15 of course will vary in length according to the positions of the corresponding chambers 13 with respect to the outer side wall of the body 1.

The outer end portions of the ducts 15 are threaded internally for engagement with end portions of branches 16 of a steam delivery conduit 17 which may be connected with any suitable source of supply of live steam. Each branch 16 of the conduit may include a valve, as indicated at 18, and the main delivery conduit 17 may include a steam gauge 19 and a steam regulator 20. The main delivery conduit 17 also may be in communication at its open end with a valved drain pipe or cock 21.

A seed carrier for moving the seed that is to be treated in proximity to the steam discharge orifices 14 may comprise a cylindrical body 22 which is secured by suitable means, such as the spokes 23 and the hub 24, on a shaft 25 to rotate in the sterilizing space between the sections A and B of the housing about an axis which is equi-distant from all points on the concavely curved side walls of the cavities 2 and 6.

The shaft 25 extends through aligned openings in the ends of the housing A—B, each of such openings being formed through the meeting edge portions of end extensions 3—7 of the sections A—B, portions of adjacent flanges 4—8 being cut away for the reception of bearings 26 which are secured by fastening devices 27 to the ends of the housing and in which the end portions of the shaft 25 are journaled and supported.

The cylindrical body 22 carries on its outer periphery a circumferentially extending series of longitudinal troughs 28. Each trough 28 has straight radial side walls extending longitudinally of the cylindrical carrier and the side walls of each trough are connected at their ends by straight sided end walls 30. The walls of each trough 28 may be integral with the cylindrical body 22 or may be formed separately and secured to the cylindrical body 22 on the periphery of the latter. The length of each trough 28 is such that the outer faces of the end walls of that trough will move in close proximity to the corresponding end walls of the sterilizing space within the housing when the shaft 25 is rotated, there not being sufficient space between adjacent end walls of the trough and housing to permit small seeds to fall between such adjacent walls. The outer edges of the end walls of the troughs 28 are convexly curved to conform to the curvature of the side walls of the cavities 6 and 2 so that rotation of the shaft 25 will cause the outer ends of the troughs to move sufficiently close to the concavely curved side walls of the cavities 2 and 6 to preclude the dropping of seeds between the rim edges of the trough and the side walls of the cavities 2 and 6, it of course being understood that the side walls 29 of each trough terminate at their outer edges flush with the outer edges of the end walls 30 with which they are associated.

A driven gear 31 is secured on an end portion of the shaft 25 outside of the housing of the sterilizer. A short shaft 32 has a sleeve 33 rotatably mounted thereon. The middle portion of this sleeve carries a pulley 34 which is secured thereto while drive gears 35 and 36 respectively are secured on opposite end portions of the sleeve 33. The end portions of the shaft 32 extend beyond the ends of the sleeve 33 and are adapted to be placed selectively in an opening 37 in a supporting block 38 and to be releasably secured against displacement from the opening 37 by means of a set screw 39. The shaft 32 is provided with diametrical openings 40 at opposite ends of the sleeve 33 and a retaining pin 41 is removably disposed in the opening 40 at the outer end of the sleeve 33 when one end portion of the shaft 32 has been secured in the opening 37 of the block 38, whereby the sleeve 33 will be held against axial movement on the shaft 32 by the coaction of the pin 41 and the block 38. The block 38 is adapted to be secured adjustably and detachably to the flanges 4—8 at one end of the housing of the sterilizer so that the shaft 32 will be disposed parallel to the shaft 35 and one of the drive gears 35 or 36 will be in mesh with the driven gear 31. To this end, one face of the block 38 is substantially flat and is adapted to rest against one of the flanges 4—8 on the adjacent end of the housing of the sterilizer, while angular lugs 42 on the block 38 on the outer side of the latter embrace the edge portions of the flanges 4—8 and are clamped firmly thereto by means of screws 43 which are threaded through the block 38 against the flange with which the block 38 is in contact. It is manifest that the speed of rotation of the shaft 25 can be varied when the shaft 32 is driven at a constant speed by reversing the shaft 32 end for end in the opening 37 of the block 38 and by adjusting the position of the block 38 on the end of the housing of the sterilizer as required to cause the particular drive gear 35 or 36 that is on the inner end of the sleeve 33 to mesh with the driven gear 31 irrespective of the particular end portion of the shaft 32 that is secured in the opening 37 of the block 38. From the foregoing description of the various parts of the device, the operation thereof may be readily understood. Heated or live steam passes from the main delivery conduit 17 through the branch 16 into the steam chambers 13. A torque may be transmitted to the pulley 34 in any suitable known manner so that the shaft 25 will be rotated in a counter-clockwise direction and the troughs 28 will be moved past the opening 10 close to the concavely curved inner side wall of the cavity 2. Cotton or other seeds which are to be treated are fed through the opening 10 into the troughs 28 of the rotating carrier and are carried in proximity to the discharge orifices 14 through which heated or live steam is discharged from the chambers 13 into the troughs 28. Since the troughs 28 are comparatively shallow and of substantial width, the seeds will be spread out to comprise a relatively thin layer on the periphery of the rotating carrier and since the discharge orifices or ports 14 are spaced along the entire length of the carrier 22 and the respective chambers 13 also are spaced vertically or in other words from the lower end to the upper end of the concavely curved inner side wall of the cavity 2, all seeds within the troughs will be subjected to the action of the heated or live steam and will be uniformly and thoroughly sterilized during the passage of each trough in proximity to the concavely curved side wall of the cavity 2 from the opening 10 to the opening 11. The steam of course will be discharged at relatively high velocity in the form of jets into the troughs since the orifices 14 are relatively small in cross sectional area. Since the troughs 28 have straight radial side walls, each trough will enlarge slightly in width from its inner to its outer end, thus preventing clogging of seeds in the outer end of each trough and securing thorough sterilization of all seeds that are within each trough during the passage of the trough in proximity to the concavely curved inner side wall of the cavity 2. The seeds will fall by gravity from each trough through the opening 11 into any suitable conveyor positioned beneath the opening 11 for receiving or conveying treated seeds to a desirable place.

It has been found in actual practice that the treating of cotton seeds with live steam in the manner just described will result in the complete extermination of pink boll worms and such other insects and germs as hibernate in or infest cotton seeds and moreover that the treated seeds will not be injured but will be rendered immune to damage which otherwise would be caused by generated heat after the seeds have been stored in bulk for any appreciable length of time. Obviously, seeds other than cotton seeds can be treated with live steam by means of the sterilizer with results equally satisfactory as those just mentioned in connection with the treatment of cotton seeds. It is likewise obvious that, with a simple modification of the partition walls of the carrier troughs, cotton seed, while still unginned, commonly called "seed cotton," can be effectually treated in this machine, and the process impart to the lint a toughness that is much desired for proper ginning. This before-ginning treatment will also result in the destruction of all boll weevils, or other enemy insects of cotton, which usually take shelter in the latest of the open bolls, while the cotton is still in the fields, and when not killed in the ginning process, find hibernating quarters in and around the gin plant, to become the propagators of the first generation of weevils to devour the new crop.

I claim:—

1. A sterilizer comprising a housing having a concavely curved inner wall provided with an inlet opening and with an outlet opening spaced from said inlet opening, a carrier rotatably supported within the housing, a series of seed receptacles on the periphery of said carrier, said receptacles being open only at the sides thereof next to said concavely curved wall of the housing and the edges of said receptacles being adapted to move sufficiently close to said concavely curved wall of said housing to prevent cotton or other seeds from passing from said receptacles between the edges of the receptacles and said concavely curved wall of the housing, and means opening through said concavely curved inner wall of the housing for discharging live steam directly into said seed receptacles on the carrier.

2. A sterilizer comprising a housing having a concavely curved inner wall and having an inlet opening for seeds at one end of said concavely curved wall and an outlet opening for seeds at the opposite end of said concavely curved inner wall, said housing having spaced rows of spaced discharge orifices opening through said concavely curved inner wall, through which live steam may be discharged into the space within said concavely curved inner wall, a cylindrical carried mounted to rotate within said housing about an axis located at equal distances radially from all points on said concavely curved inner wall, and a series of shallow troughs on said cylindrical carrier for carrying seeds in proximity to said concavely curved inner wall and in the path of discharge of steam from said discharge orifices, said troughs having straight radial side walls and also having end walls, whereby said troughs will be open only at the sides thereof next to said concavely curved inner wall of the housing.

3. A sterilizer comprising a housing having a concavely curved inner wall and having an inlet opening for seeds at one end of said concavely curved wall and an outlet opening for seeds at the opposite end of said concavely curved inner wall, said housing having spaced rows of spaced discharge orifices opening radially through said concavely curved inner wall through which live steam may be discharged into the space within said concavely curved inner wall, a cylindrical carrier mounted to rotate within said housing about an axis located at equal distances radially from all points on said concavely curved inner wall, a series of shallow troughs on said cylindrical carrier for carrying seeds in proximity to said concavely curved inner wall and in the path of discharge of steam from said discharge orifices, each of said troughs comprising a pair of spaced radial side walls and a pair of end walls, and a motion transmission mechanism for transmitting a torque from a source of power to said carrier.

4. A sterilizer comprising a housing having two spaced concavely curved inner walls both lying in arcs of a circle struck by the radius moving in a vertical plane, one of said concavely curved inner walls being relatively large and extending through approximately 180°, a cylindrical carrier supported in said housing to rotate about an axis concentric with the aforesaid circle, said housing having an inlet opening for seeds between two adjacent ends of the concavely curved inner walls of the housing and having an outlet opening for seeds between the other two adjacent ends of said concavely curved inner walls, said housing having spaced rows of spaced discharge orifices opening through said relatively large concavely curved inner wall of the housing through which live steam may be discharged toward said carrier, and a circumferential series of shallow troughs on the periphery of said carrier, said troughs being open only at their outer sides and being movable with the carrier in proximity to said concavely curved inner walls of the housing and in the path of steam jets from said discharge orifices, the space within each of said troughs being unobstructed and the edges of the walls of the trough moving close to the inner walls of said housing.

5. A machine for sterilizing cotton and other seeds comprising a housing, a seed carrier mounted to rotate in the housing, said seed carrier and said housing cooperating to confine a shallow mass of seeds between the periphery of the carrier and the adjacent wall of the housing, and means carried by said housing for discharging live steam directly into said mass of seeds.

6. A machine for sterilizing cotton and other seeds comprising a housing, a seed carrier mounted to rotate in the housing, said seed carrier and said housing cooperating to confine a shallow mass of seeds between the periphery of the carrier and the adjacent wall of the housing, means carried by said housing for discharging live steam directly into said mass of seeds, said housing having an inlet for seeds and an outlet for seeds, said inlet and said outlet both being located radially outward from the periphery of said seed carrier, said seed carrier having means for engaging with said mass of seeds to cause said seeds to move with the carrier from said inlet to said outlet.

PARRISH HENDRICKS RYLANDER.